(12) United States Patent
Koga

(10) Patent No.: US 11,381,528 B2
(45) Date of Patent: Jul. 5, 2022

(54) INFORMATION MANAGEMENT APPARATUS AND INFORMATION MANAGEMENT METHOD

(71) Applicant: FUJITSU LIMITED, Kawasaki (JP)

(72) Inventor: Susumu Koga, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 105 days.

(21) Appl. No.: 16/545,427

(22) Filed: Aug. 20, 2019

(65) Prior Publication Data

US 2020/0067853 A1    Feb. 27, 2020

(30) Foreign Application Priority Data

Aug. 24, 2018 (JP) .............................. JP2018-157541

(51) Int. Cl.
| | | |
|---|---|---|
| H04L 51/02 | (2022.01) | |
| G06Q 30/00 | (2012.01) | |
| H04L 51/04 | (2022.01) | |
| G06F 16/9532 | (2019.01) | |
| G06F 16/9535 | (2019.01) | |

(52) U.S. Cl.
CPC .......... *H04L 51/02* (2013.01); *G06F 16/9532* (2019.01); *G06F 16/9535* (2019.01); *G06Q 30/016* (2013.01); *H04L 51/04* (2013.01)

(58) Field of Classification Search
CPC ....... H04L 51/02; H04L 51/04; G06Q 30/016; G06F 16/9532; G06F 16/9535
USPC ................................................. 709/206, 217
See application file for complete search history.

(56) References Cited

U.S. PATENT DOCUMENTS

| | | | |
|---|---|---|---|
| 6,745,367 B1* | 6/2004 | Bates ...................... | G06F 21/62 |
| | | | 715/205 |
| 9,167,095 B1* | 10/2015 | Selvin ................. | H04M 3/5175 |
| 2010/0156893 A1* | 6/2010 | Mihara .................. | H04N 21/47 |
| | | | 345/419 |
| 2013/0034271 A1* | 2/2013 | Sakaguchi ............ | G06T 3/4053 |
| | | | 382/107 |
| 2016/0098652 A1* | 4/2016 | Leigh .................. | G06Q 10/0635 |
| | | | 705/7.28 |
| 2017/0017695 A1* | 1/2017 | Higuchi ............... | G06F 16/3329 |
| 2021/0012352 A1* | 1/2021 | Yamagishi .......... | G06F 16/3329 |

FOREIGN PATENT DOCUMENTS

| | | |
|---|---|---|
| JP | 2016-151929 A | 8/2016 |
| JP | 2017-107348 A | 6/2017 |
| JP | 2017-123073 A | 7/2017 |

\* cited by examiner

*Primary Examiner* — David R Lazaro
*Assistant Examiner* — Mariegeorges A Henry
(74) *Attorney, Agent, or Firm* — WHDA, LLP

(57) ABSTRACT

An information management apparatus includes a memory configured to store view histories of information relating to inquiry information including identifiers of users and contents of inquiries, and a processor coupled to the memory and the processor configured to perform extraction of a first view history of a first user from the view histories in response to receiving first inquiry information including an identifier of the first user and a content of a first inquiry, perform, based on the content of the first inquiry, determination of whether the first view history of the first user includes first information relating to the first inquiry information, and perform modification of a first evaluation value associated with the first information when it is determined that the first view history includes the first information.

13 Claims, 13 Drawing Sheets

FIG. 5

| VIEW ID (1231) | FAQ ID (1232) | ARTICLE INFORMATION (1233) | VIEWED DATE AND TIME (1234) |
|---|---|---|---|
| 1 | A0000-0001 | Http://xxxx/x1.html | yyyy/mm/dd 12:58 |
| 2 | A0000-0002 | Http://yyyy/y1.html | yyyy/mm/dd 13:10 |
| 3 | A0000-0003 | Http://zzzz/z1.html | yyyy/mm/dd 13:15 |
| ⋮ | ⋮ | ⋮ | ⋮ |

FIG. 7

| INCIDENT ID 1211 | OS 1212 | PRODUCT CATEGORY 1213 | PRODUCT NAME 1214 | VERSION INFORMATION 1215 | RELATED INCIDENT ID 1216 |
|---|---|---|---|---|---|
| B0000-0001 | OS_001 | Product category | APS_01 | 11.0.0 | B0000-XXXX |
| B0000-0002 | OS_002 | Operations Control | OC_02 | 10.0.1 | B0000-YYYY |
| B0000-0003 | OS_003 | Database System | DB_03 | 9.0.0 | B0000-ZZZZ |

| TITLE 1217 | BODY 1218 | TAG INFORMATION 1219 |
|---|---|---|
| AAA | ... | TROUBLE, NETWORK |
| BBB | ... | TROUBLE, OS, LOG-IN |
| CCC | ... | PRODUCT FAILURE, NETWORK, DB |

FIG. 8

| FAQ ID | ARTICLE INFORMATION | EVALUATION VALUE |
|---|---|---|
| A0000-0001 | Http://xxxx/x1.html | 0 |
| A0000-0002 | Http://yyyy/y1.html | -1 |
| A0000-0003 | Http://zzzz/z1.html | -5 |
| ⋮ | ⋮ | ⋮ |

INFORMATION MANAGEMENT APPARATUS AND INFORMATION MANAGEMENT METHOD

CROSS-REFERENCE TO RELATED APPLICATION

This application is based upon and claims the benefit of priority of the prior Japanese Patent Application No. 2018-157541, filed on Aug. 24, 2018, the entire contents of which are incorporated herein by reference.

FIELD

The embodiment discussed herein is related to information management technology.

BACKGROUND

A support system that provides supports to a user of a product or a computer system may be provided by a provider of the product or the computer system. For example, a call center is provided where a support staff receives from a user an inquiry (which may be called an "incident") about an unclear point regarding a product or about how to deal with a system trouble. The support staff having received an incident investigates the received incident and provides answer information to the user. The received incidents and answer information are stored in the support system so that the support staff and other support staffs may view and may be used for dealing with incidents that will be received after that. For implementation of a better support system, the stored answer information is evaluated for example based on the skill levels of the staffs who have created the answer information. Based on the evaluations on the answers, the support staffs may easily or quickly find out proper answer information.

For example, Japanese Laid-open Patent Publication No. 2016-151929 discloses related art.

SUMMARY

According to an aspect of the embodiments, an information management apparatus includes a memory configured to store view histories of information relating to inquiry information including identifiers of users and contents of inquiries, and a processor coupled to the memory and the processor configured to perform extraction of a first view history of a first user from the view histories in response to receiving first inquiry information including an identifier of the first user and a content of a first inquiry, perform, based on the content of the first inquiry, determination of whether the first view history of the first user includes first information relating to the first inquiry information, and perform modification of a first evaluation value associated with the first information when it is determined that the first view history includes the first information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of information stored in a view history information storage unit;

FIG. 7 illustrates an example of information stored in an incident information storage unit;

FIG. 8 illustrates an example of information stored in an FAQ information storage unit;

DESCRIPTION OF EMBODIMENTS

In consideration of a limited staff resource for support, a lower number of incidents are desirably received. Accordingly, it may be considered that answer information to incidents frequently received from users of the stored answer information is made available to users so that a user may view the answer information, as in a frequently asked questions (FAQ) site. Thus, without issuing an inquiry to a support staff, a user may solve a problem by himself or herself based on the answer information viewed by him or her. However, according to the prior art, it may not be recognized if the answer information that is viewed but is less useful is included in view information such as FAQs, and it is difficult to properly manage the view information such as FAQs.

Figure 1:
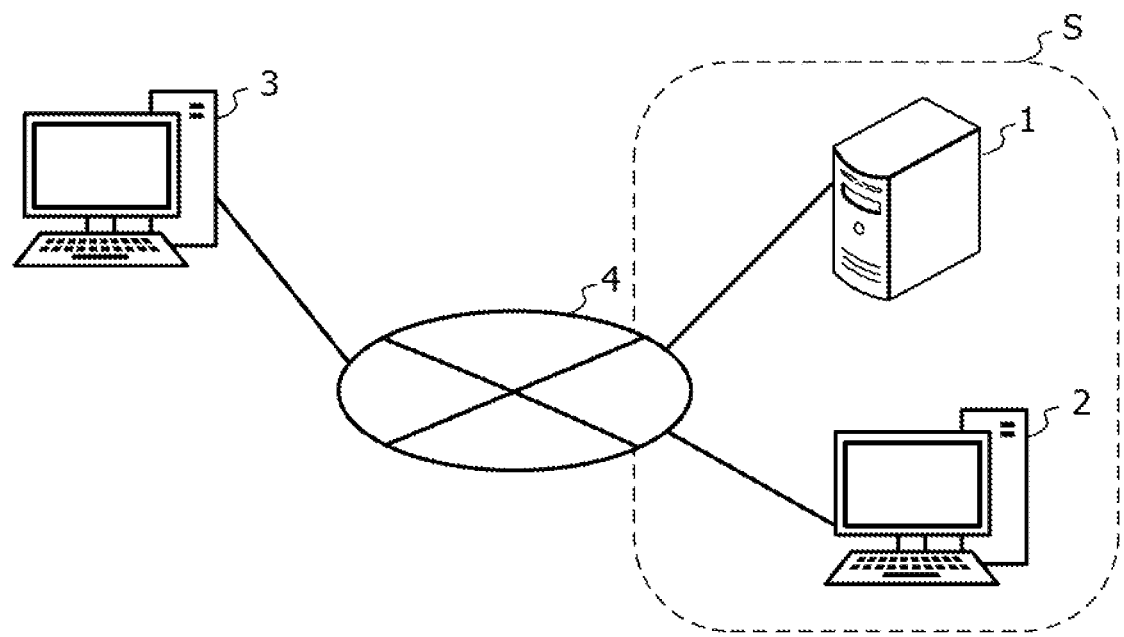
FIG. 1 illustrates an example of a system configuration according to an embodiment.

FIG. 1 is a diagram illustrating an example of a system configuration according to an embodiment. An incident management system S illustrated in FIG. 1 includes a server apparatus 1 and a management terminal apparatus 2. The server apparatus 1 and the management terminal apparatus 2 are communicably connected in a wired or wireless manner over a network 4. A user terminal apparatus 3 may access the incident management system S through the network 4. The server apparatus 1 is an example of an information management apparatus.

The server apparatus 1 responds to an incident received from the user terminal apparatus 3. The server apparatus 1 stores various kinds of information to be used for dealing with an incident received from the user terminal apparatus 3. The control apparatus 1 may be implemented by a computer in the server apparatus as hardware.

The management terminal apparatus 2 may execute an operation on the server apparatus 1 by using a remote operation function, for example. The management terminal apparatus 2 may be used by a support staff for dealing with an incident received from the user terminal apparatus 3. The management terminal apparatus 2 is an information processing apparatus such as a personal computer (PC), a smartphone and a personal digital assistant (PDA).

FIG. 1 illustrates a system configuration example including one server apparatus 1, one management terminal apparatus 2, and one user terminal apparatus 3. However, processes to be described according to this embodiment may be implemented even when the specific numbers of the apparatuses are changed properly.

Figure 2:
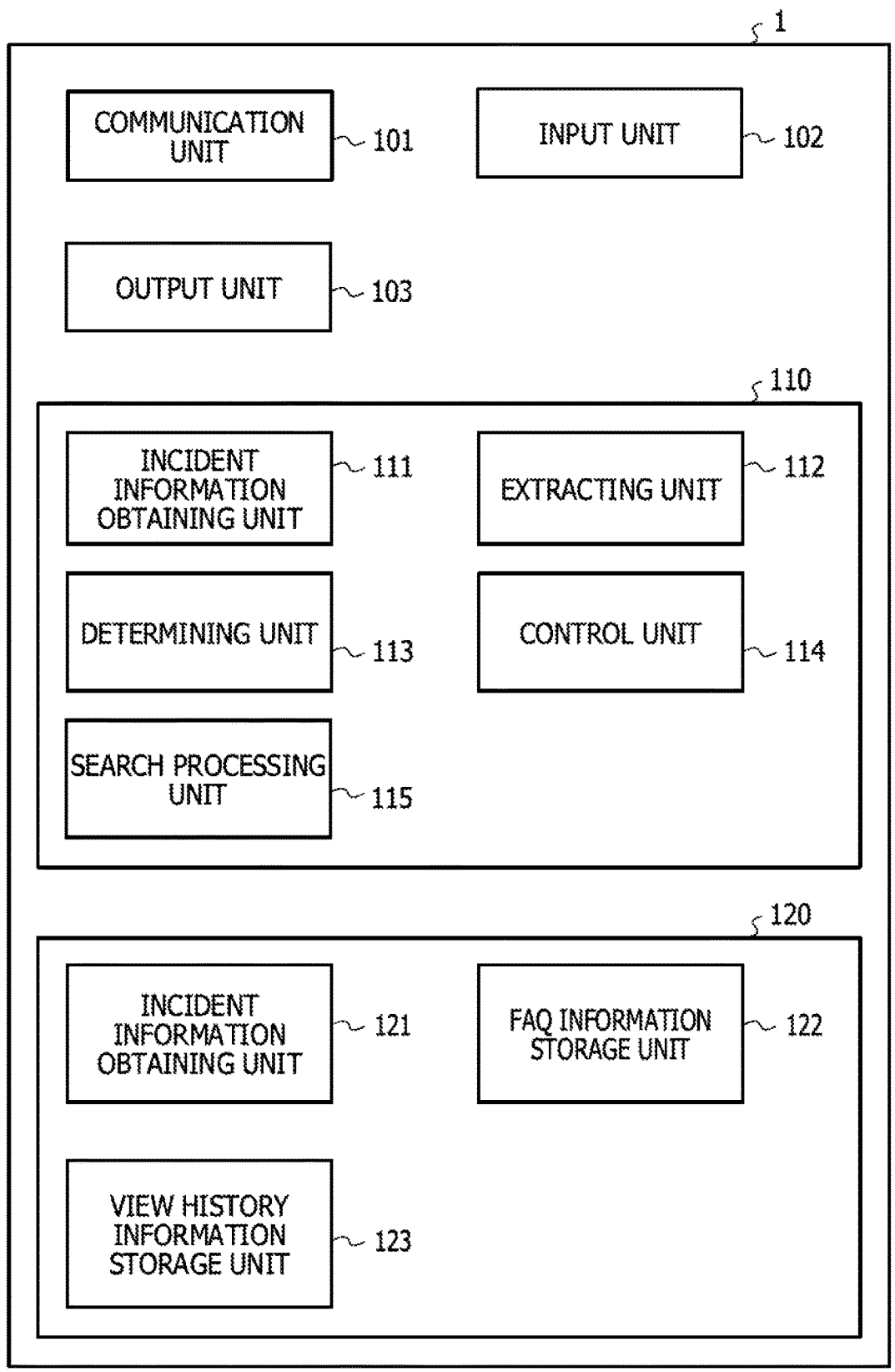
FIG. 2 illustrates a functional configuration of a server apparatus.

FIG. 2 is a functional block diagram illustrating a functional configuration of the server apparatus 1. The server apparatus 1 includes a communication unit 101, an input unit 102, an output unit 103, a processing unit 110, and a storage unit 120, for example.

The communication unit 101 may execute communication with other apparatuses including the management terminal apparatus 2 and the user terminal apparatus 3 in a wired or wireless manner. The communication unit 101 is a communication device such as a network adapter or a network interface controller (NIC) included in the server apparatus 1, for example.

The input unit 102 receives an information input and an operation from a user (including a system administrator). The input unit 102 is a keyboard, a mouse, a touchpad, or the like, for example, as hardware. The output unit 103 may output various kinds of information stored in the storage unit 120 and a result of dealing with an incident. The output unit 103 is a display, for example, as hardware. For example, the server apparatus 1 may be operated remotely by another information processing apparatus (such as the management terminal apparatus 2) including functions and hardware of the input unit 102 and the output unit 103, and the server apparatus 1 may not be provided.

The processing unit 110 includes an incident information obtaining unit 111, an extracting unit 112, a determining unit 113, a control unit 114 and a search processing unit 115.

The incident information obtaining unit 111 obtains information regarding each incident received from the user terminal apparatus 3.

The extracting unit 112 extracts an FAQ view history of a user having issued an incident from information stored in a view history information storage unit 123, which will be described below. Here, the term "FAQ" in this embodiment refers to an incident that relates to similar inquiries frequently received from users among incidents received in the past, for example. An FAQ is information that may be viewed by a user by accessing the incident management system S by using the user terminal apparatus 3.

The determining unit 113 determines a correlation between a received incident and information viewed by a user before issuing the incident.

The control unit 114 controls an evaluation value for a past incident provided to a user as an FAQ based on a result of the determination by the determining unit 113. Here, the term "evaluation value" may also refer to an index indicative of an effectiveness of each of past incidents to be referred for dealing with an incident issued from a user. Alternatively, the term "evaluation value" may also refer to an index indicative of a deterrent against issuance of a new incident.

The search processing unit 115 provides a function for searching FAQ information to be used by the server apparatus 1 or a support staff for dealing with a received incident.

The storage unit 120 includes an incident information storage unit 121, an FAQ information storage unit 122, and the view history information storage unit 123.

The incident information storage unit 121 stores information regarding an incident received from the user terminal apparatus 3.

The FAQ information storage unit 122 stores information regarding incident information made available to users among incidents received and dealt in the past.

The view history information storage unit 123 stores past usage (view history) of FAQ information of each user.

The functional units of the server apparatus 1 having described above may partially be provided in the management terminal apparatus 2, for example. Alternatively, a part or all of the information stored in the storage unit 120 may be stored in an external storage device that the server apparatus 1 may access. The functional units and storage units above have been schematically described, and details of the units will be described below.

Figure 3:
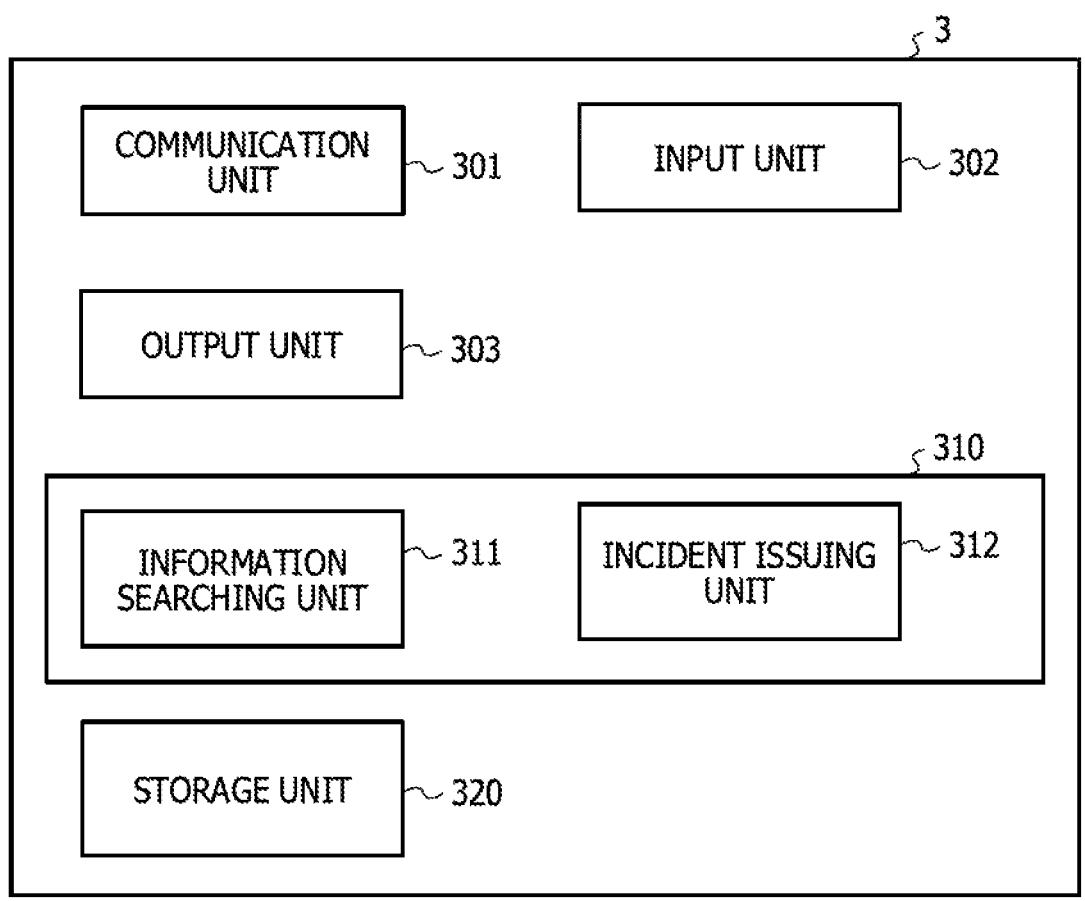
FIG. 3 illustrates a functional configuration of a user terminal apparatus.

FIG. 3 is a functional block diagram illustrating a functional configuration of the user terminal apparatus 3. The user terminal apparatus 3 includes a communication unit 301, an input unit 302, an output unit 303, a processing unit 310, and a storage unit 320, for example.

The communication unit 301 may access the incident management system S through wired or wireless communication. The communication unit 301 is a communication device such as a network adaptor or an NIC included in the user terminal apparatus 3, for example.

The input unit 302 receives an information input and an operation from a user. The input unit 302 is a keyboard, a mouse, a touchpad, or the like, for example, as hardware. The output unit 303 may output various kinds of information stored in the storage unit 320 and various kinds of information that may be obtained by accessing the incident management system S, for example. The output unit 303 is a display, for example, as hardware.

The processing unit 310 includes an information searching unit 311 and an incident issuing unit 312.

The information searching unit 311 provides functions to view and search information, such as FAQ information, provided from the incident management system S. The incident issuing unit 312 provides a function to issue an inquiry (incident) to the incident management system S or a support staff. For example, the processing unit 310 is a browser through which a user may access a web site having the information searching unit 311 and the incident issuing unit 312.

The storage unit 320 is a storage unit that may store information provided from the incident management system S as required.

Figure 4:
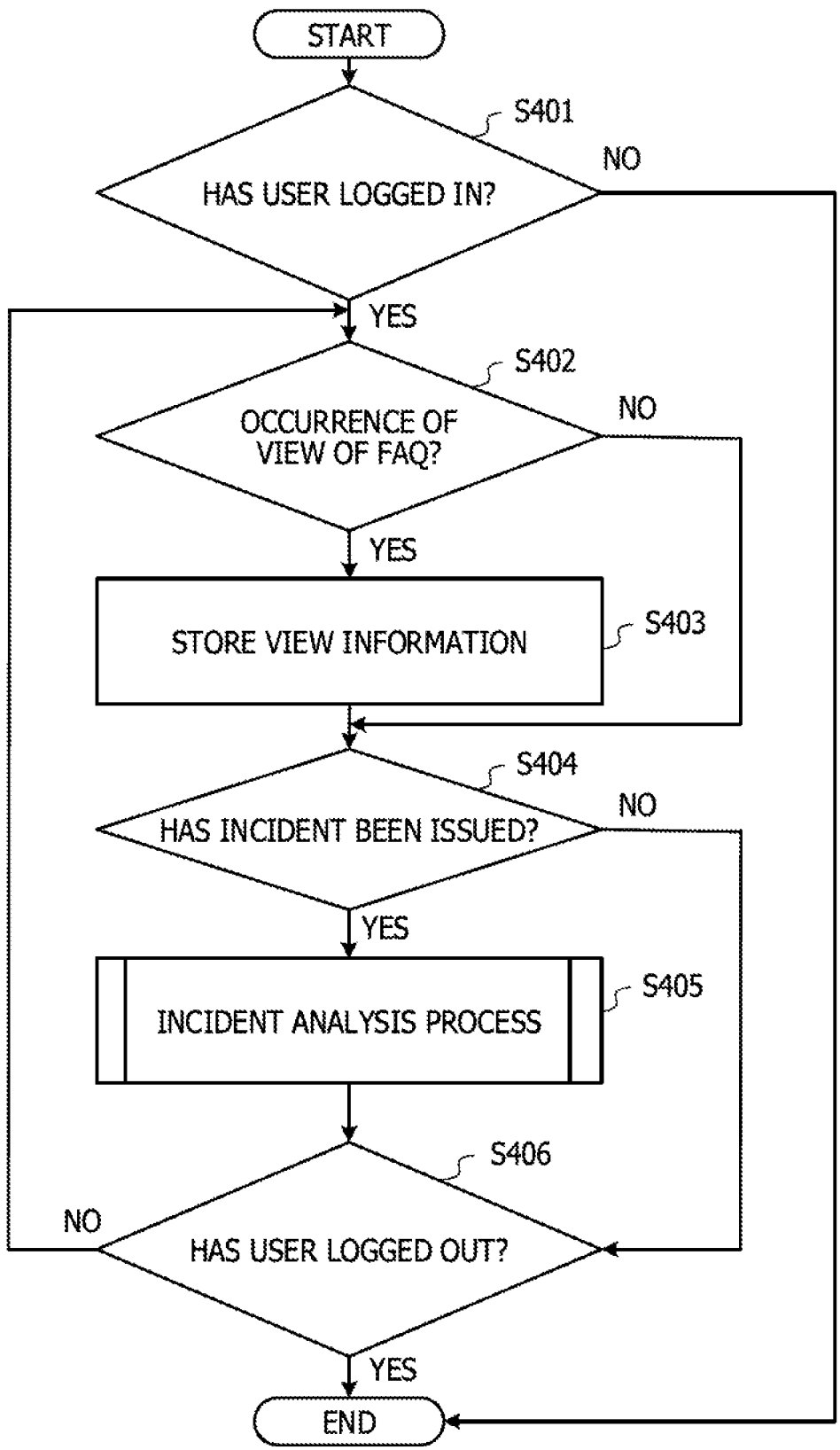
FIG. 4 is a flowchart illustrating a flow of processing to be executed by an incident management system.

FIG. 4 is a flowchart illustrating a flow of processing to be executed by the incident management system S. As an example, a user having a usage authority accesses a support system provided by using the incident management system S. It is assumed here that a user may log in the support system to view available FAQs and issue an inquiry (incident) to a support staff.

First, the server apparatus 1 determines whether a user has logged in the support system or not (step S401). If the user has not logged in (step S401, No), the process illustrated in FIG. 4 ends.

On the other hand, if the user has logged in (step S401, YES), the process moves to step S402. In other words, by taking the opportunity of the log-in by a user, the series of processes illustrated in FIG. 4 is executed on the each logged-in user. Hereinafter, the logged-in user may also simply be called a user.

In step S402, the search processing unit 115 determines whether the user has viewed an FAQ (step S402). If the user has not viewed an FAQ (step S402, NO), the process in step S404 is executed. If the user has viewed an FAQ (step S402, YES), the search processing unit 115 stores information regarding the FAQ viewing by the user as a view history in the view history information storage unit 123 (step S403).

FIG. 5 illustrates an example of information stored in the view history information storage unit 123. The view history information storage unit 123 stores, for each user, information in a record form having data columns of a view identifier (ID) 1231, an FAQ ID 1232, article information 1233 and a viewed date and time 1234, for example.

The view ID 1231 is identification information by which a record row (a history for one viewing operation) illustrated in FIG. 5 may be uniquely identified.

The FAQ ID 1232 is identification information by which each FAQ available to users may be uniquely identified.

The article information 1233 is information specifying an article of an FAQ viewed by a user. For example, the article information 1233 indicates a Uniform Resource Locator (URL) of a web page including details of an event such as a trouble or an inquiry and how it has been dealt with in association with each of the FAQ IDs 1232.

The viewed date and time 1234 is information indicating a time (date and time) when a user has viewed an FAQ.

The information as illustrated in FIG. 5 is stored in response to a view of an FAQ by a user so that details of the past viewing operations executed by the user may be specified.

Referring back to FIG. 4, in step S404 after execution of step S403, the incident information obtaining unit 111 determines whether the user has issued an incident or not (step S404). If the user has not issued an incident (step S404, NO), the process in step S406 is executed.

If an incident has been issued (step S404, YES), an incident analysis process in step S405 is executed. Details of the incident analysis process will be described below.

After the execution of step S405, the server apparatus 1 in step S406 determines whether the user has logged out the support system or not (step S406). If the user has not logged out (step S406, NO), the processes in step S402 and subsequent steps are repeatedly executed. On the other hand, if the user has logged out (step S406, YES), the series of processes illustrated in FIG. 4 ends.

Figure 6:
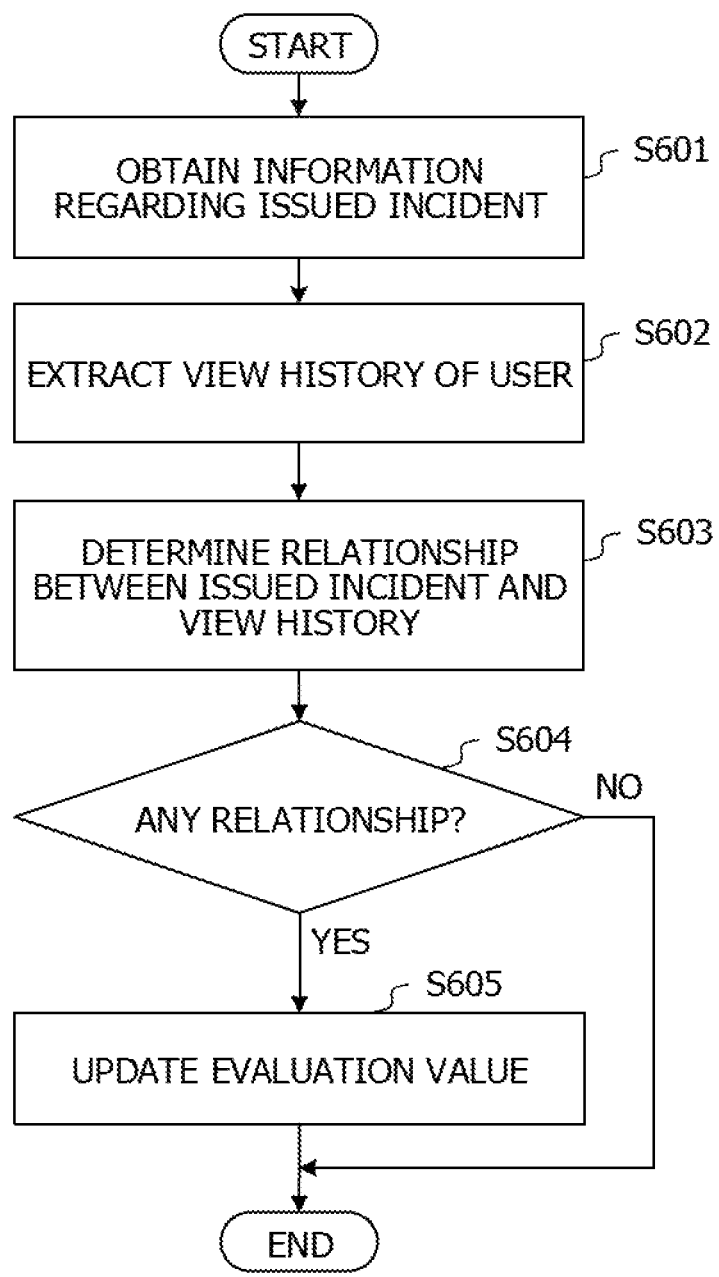
FIG. 6 is a flowchart illustrating a flow of processing to be executed in an incident analysis process.

FIG. 6 is a flowchart illustrating a flow of processing to be executed in the incident analysis process in step S405 in FIG. 4. It is assumed that, though not illustrated, if an incident has been issued, the user having issued the incident is attended by a support staff or is automatically attended by the incident management system S, separately from the process illustrated in FIG. 6.

The incident information obtaining unit 111 obtains information relating to the issued incident (step S601).

FIG. 7 illustrates an example of information stored in the incident information storage unit 121. The incident information storage unit 121 stores information in a record form having data columns of an incident ID 1211, an operating system (OS) 1212, a product category 1213, a product name 1214, version information 1215, a related incident ID 1216, a title 1217, a body 1218, and tag information 1219, for example.

The incident ID 1211 is identification information by which a received incident is uniquely identified. The OS 1212 is information indicating a name of an OS software module to be used in an incident target product or service.

The product category 1213 is information indicating a category (product type) to which an incident target product or service belongs. The product name 1214 is information indicating a name of an incident target product or service. The version information 1215 is information indicating a version of an incident target product or service.

The related incident ID 1216 is identification information of an incident determined as being related to an incident identified with the incident ID 1211. Each of the incidents identified with the related incident ID 1216 is also one of received incidents.

The title 1217 is information indicating a subject name of an incident. The body 1218 is information indicating details of a received incident. The tag information 1219 is information indicating a feature word corresponding to a detail of a received incident.

The measure that generates and stores the information to be stored in the incident information storage unit 121 is not uniquely limited. For example, such information may be generated by a support staff receiving an inquiry from a user as a record of details of an incident. Alternatively, when an inquiry is received, data input from a user may be received so that such information may be generated and be stored. In a case where the FAQs illustrated in FIG. 5 are incidents having been received in the past, the information on the incidents corresponding to the FAQs, not illustrated, are also stored in the incident information storage unit 121. Therefore, for example, the incident ID 1211 and the FAQ ID 1232 have an identical value (identification information) for one incident so that the information association may be achieved. If the incident ID 1211 and the FAQ ID 1232 are associated, the incident ID 1211 and the FAQ ID 1232 may have different values for one incident.

FIG. 6 will be described again. The extracting unit 112 extracts an FAQ view history of a user having issued an incident from the view history information storage unit 123 (step S602). For example, based on a user ID that is obtained when a user logs in or issues an incident, the extracting unit 112 may extract view history information corresponding to the user ID. All of the view history information corresponding to the user ID may be extracted, or, for example, view history information within a predetermined period may be extracted by excluding, from extraction target information, view history information prior to a predetermined period (such as three or more days) from issuance of an incident.

The determining unit 113 then determines whether there is a relationship between the issued incident and a past incident included in the view history (step S603). It may be determined that there is a relationship if the number of data columns having matching data values is equal to or higher than 50% of all data columns (data items) illustrated in FIG. 7, for example. For example, the determining unit 113 compares a data row corresponding to a past incident stored in the incident information storage unit 121 and a data row corresponding to an issued incident. As a result of the comparison, in a case where values of five or more data columns, that are over 50% of all of nine data columns, of data columns 1211 to 1219 are matched, the determining unit 113 determines that the issued incident is related to the compared past incident. The percentage of matching used as the determination criterion for the relationship is not uniquely limited to 50% but may be changed properly in accordance with the degree of a required relationship or data form. A data column with a value assumed as having a lower possibility for matching than other data columns, like the body 1218 in FIG. 7, for example, may be excluded from the data columns to be used for the determination.

If it is determined that there is no relationship (step S604, NO), the incident analysis process in FIG. 6 ends. On the other hand, if there is a relationship (step S604, YES), the control unit 114 updates the evaluation value for the issued incident (step S605).

FIG. 8 illustrates an example of information stored in the FAQ information storage unit 122. The FAQ information storage unit 122 stores information in a record form having data columns of an FAQ ID 1221, article information 1222, and an evaluation value 1223, for example.

The FAQ ID 1221 and the article information 1222 are the same information as the FAQ ID 1232 and the article information 1233 illustrated in FIG. 5. The evaluation value 1223 is information indicating an evaluation value for each FAQ. According to this embodiment, as the value of the evaluation value 1223 decreases, the effectiveness of the FAQ for dealing with the incident issued by a user decreases. In other words, for example, in the example in FIG. 8, the FAQ having "FAQ ID 1232=A0000-0001" has the highest effectiveness, and the FAQ having "FAQ ID 1232=A0000-0003" has the lowest effectiveness.

An example of the evaluation value update according to this embodiment will be described. If it is determined that there is a relationship in step S604, the control unit 114 updates the evaluation value 1223 for the FAQ that is determined as being related to the issued incident (which may be called a "related FAQ" hereinafter).

More specifically, the control unit 114 updates the evaluation value 1223 such that the effectiveness (or deterrent of the incident) indicated by the evaluation value 1223 for the related FAQ is low. For example, the control unit 114 updates the value of the evaluation value 1223 for the related FAQ to "current evaluation value −1". However, the specific degree of change of the evaluation value may not be limited to the above example. After the process in step S605 ends, the series of processes illustrated in FIG. 6 ends.

The meaning of the incident analysis process described above will be described. A case is assumed that there is a history that a user has viewed a related FAQ before the user issues an incident (step S604, YES, above). In this case, it may be said that the user might not solve his or her trouble (occurring event) even though the user has viewed the FAQ related to the trouble. It may be considered that the related FAQ expected to be used for solving the trouble is made available to users but there is a possibility that the related FAQ does not actually contribute to the trouble solving. More specifically, for example, even though the information of the FAQ is correct information, there may be a possibility that the information includes details that are difficult to interpret or understand for the user.

Therefore, the control unit 114 updates the evaluation value that is an index of effectiveness such that the effectiveness of the related FAQ is recognized as being low. An FAQ is evaluated as a result of viewing of the FAQ and issuing of an incident by a user so that the effectiveness of the FAQ may be properly evaluated from a viewpoint of whether the FAQ has contributed to solving of the trouble that the user has by himself or herself. For example, review and revision of details of an FAQ having the evaluation value 1223 equal to or lower than a predetermined value may be proposed to increase the effectiveness of the FAQ that is to be made available. The process for proposing review and revision of details may be performed for example by outputting a correspondence list between FAQs and evaluation values by the server apparatus 1 or by outputting information indicating an FAQ having the evaluation value 1223 equal to or lower than a predetermined value along with a message that suggests (recommends) to improve and revise the FAQ by the server apparatus 1. When the effectiveness of an FAQ is increased, the possibility that a user solves his or her trouble by himself or herself increases. This contributes to suppression of an inquiry to a support staff (or issuance of an incident). The suppression of issuance of an incident also reduces the processing load on the incident management system S (or server apparatus 1) that operates for dealing with the incident, advantageously.

Figure 9:
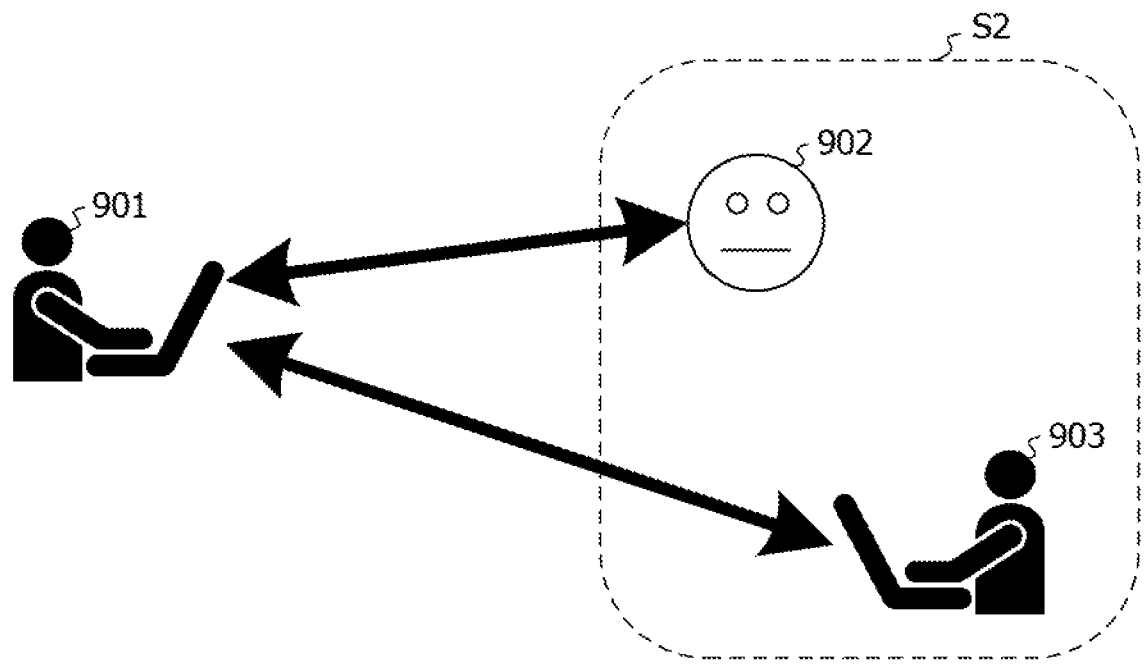
FIG. 9 schematically illustrates a variation example of the embodiment.

Next, a variation example of the above-described embodiment will be described. FIG. 9 is a diagram schematically illustrating the variation example. An incident management system S2 according to the variation example has a function called a chatbot (which may also be called a chatterbot). The chatbot is a computer program (computer function) that interacts with a user, determines information requested by the user and provides the information. The incident management system S2 is configured to use the chatbot 902 to collect information regarding an inquiry from a user 901 and, based on the collected information, transmit information requested by the user (such as an FAQ relating to the corresponding trouble) to the user 901 (or the terminal apparatus of the user 901). On the other hand, the incident management system S2 provides a user with not only the chatbot 902 but also a measure that allows issuance of an inquiry (incident) from the user terminal apparatus 901 to the support staff 903.

The incident management system S2 may be the incident management system S including the processing unit 110 further having the function of the chatbot 902, for example. The following description assumes that the incident management system S2 is the incident management system S including the server apparatus 1 further having a function that implements the chatbot 902.

Figure 10:
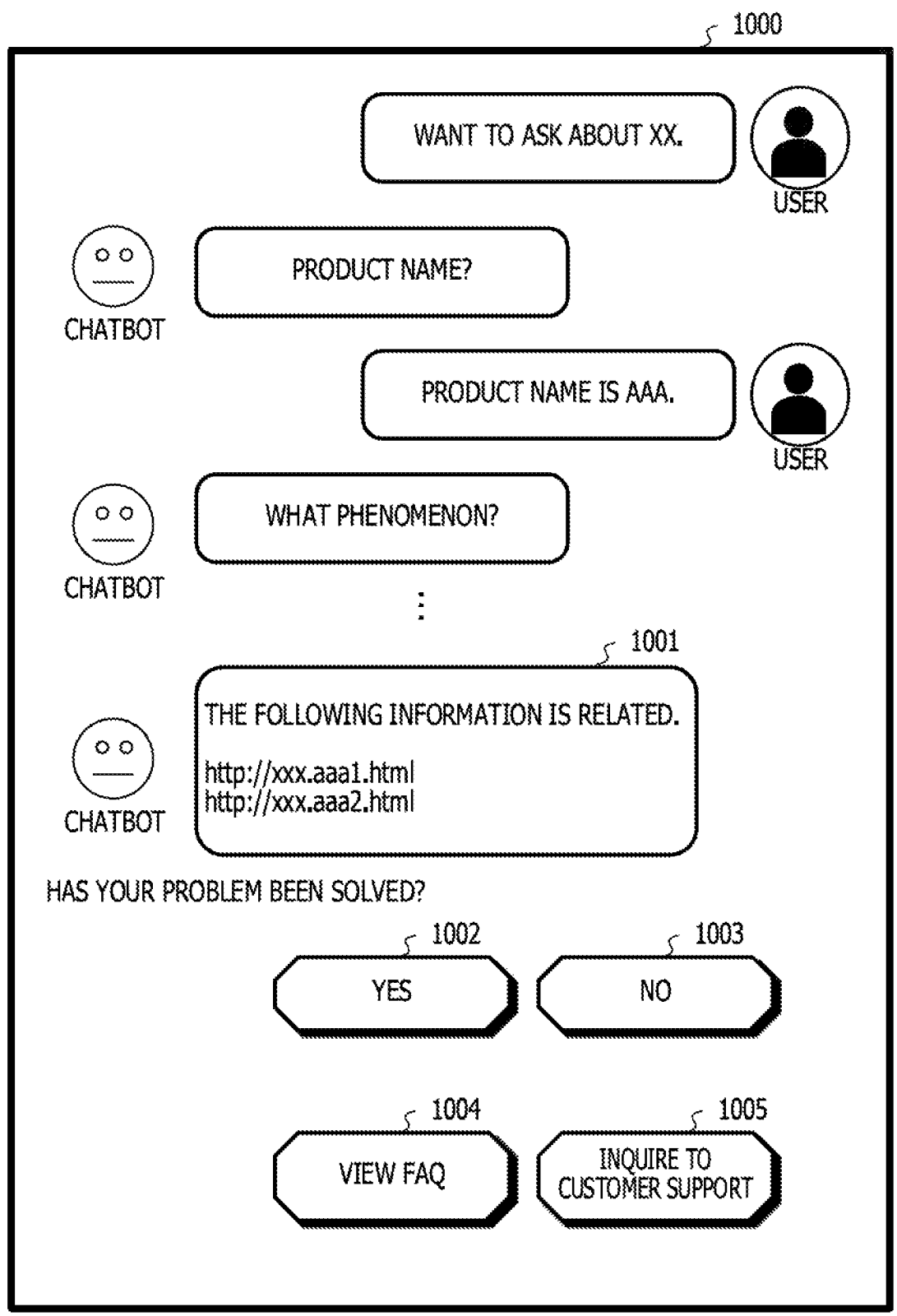
FIG. 10 illustrates an example of a user interface provided by an incident management system.

FIG. 10 is a diagram illustrating an example of a user interface (UI) provided by the incident management system S2. A UI window 1000 in FIG. 10 is displayed on a display screen on the output unit 303 in the user terminal apparatus 3, for example.

Through the UI window 1000, a chatbot function and an inquiry (incident issuance) function are provided to a user (user terminal apparatus 3).

For example, the incident management system S2 uses the chatbot function to collect information from a user and outputs related information 1001 based on the collected information. The related information 1001 according to this embodiment includes information extracted from the FAQ information storage unit 122 based on collected information, for example.

The user terminal apparatus 3 may transmit a result of determination on whether the problem has been solved or not to the incident management system S2 in response to an operation of pressing a button 1002 or 1003 by the user within the UI window 1000. A user may search and view FAQ information through the user terminal apparatus 3 in response to an operation of pressing a button 1004 by the user. A user may inquire of a support staff through the user terminal apparatus 3 in response to an operation of pressing a button 1005 by the user. In other words, for example, the incident management system S2 may receive a request for viewing FAQs or an inquiry from a user in response to an operation of pressing a button within the UI window 1000.

The UI window 1000 illustrated in FIG. 10 is merely an example of this embodiment, and the specific implementation is not limited to the form illustrated in FIG. 10.

Figure 11:
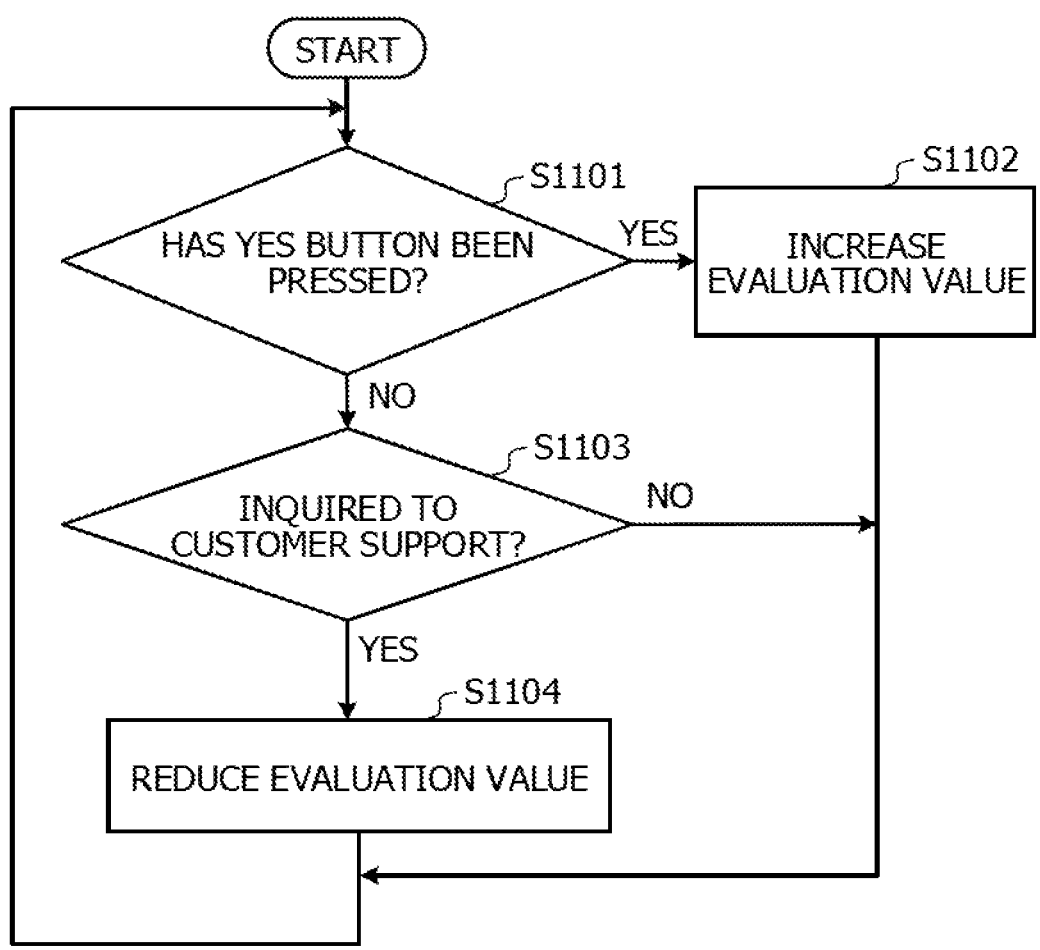
FIG. 11 is a flowchart illustrating an example of an incident analysis process in the incident management system.

FIG. 11 is a flowchart illustrating an example of the incident analysis process in the incident management system S2. The process illustrated in FIG. 11 is continuously executed while, for example, the UI window 1000 is being displayed on the terminal apparatus used by the user 901. It is assumed that, before the process illustrated in FIG. 11, the related information 1001 has been transmitted from the chatbot 902 to the user terminal apparatus 3.

First, the determining unit 113 determines whether the button 1002 that notifies that a problem has been solved has been pressed or not on the UI window 1000 (step S1101). If the button 1002 has been pressed (step S1101, YES), the control unit 114 updates the evaluation value 1223 for the FAQ included in the related information 1001 presented from the chatbot 902 (step S1102). More specifically, the control unit 114 updates the evaluation value 1223 for the FAQ included in the related information 1001 with a numerical value indicating a higher effectiveness.

If the button 1002 has not been pressed or if the button 1003 has been pressed (step S1101, NO), the process in step S1103 is executed. The determining unit 113 determines whether an inquiry to a customer support has been made or not (step S1103). More specifically, for example, the determining unit 113 determines whether the button 1005 for making an inquiry to the customer support has been pressed or not. If the button 1005 has been pressed (step S1103, YES), the control unit 114 updates the evaluation value 1223 for the FAQ included in the related information 1001 presented from the chatbot 902 (step S1104). More specifically, the control unit 114 updates the evaluation value 1223 for the FAQ included in the related information 1001 with a numerical value indicating a lower effectiveness. The process in step S1104 may be executed if the button 1005 is pressed within a predetermined period from the time when the related information 1001 is transmitted or displayed.

After the step S1104 is executed or if the button 1005 has not been pressed (step S1103, NO), the processes from step S1101 are repeatedly executed.

In the series of processes illustrated in FIG. 11, the degree of change of the evaluation value may be property weighted for updating. For example, the control unit 114 updates the value of the evaluation value 1223 by "the current evaluation value+3" in step S1102, and the value of the evaluation value 1223 may be updated by "the current evaluation value −1" in step S1104. This considers the fact that the frequency of contribution of an FAQ for problem solving at a level dearly notified by a user by pressing the button 1002 is rare compared with cases where the button 1002 is not pressed. In other words, for example, the weighting considers the fact that the effectiveness of the FAQ for the trouble solving is significantly high when the button 1002 is pressed. However, the aforementioned weights are merely examples of weighting. The degrees of weighting may be changed properly, or weighting may not be applied.

Figure 12:
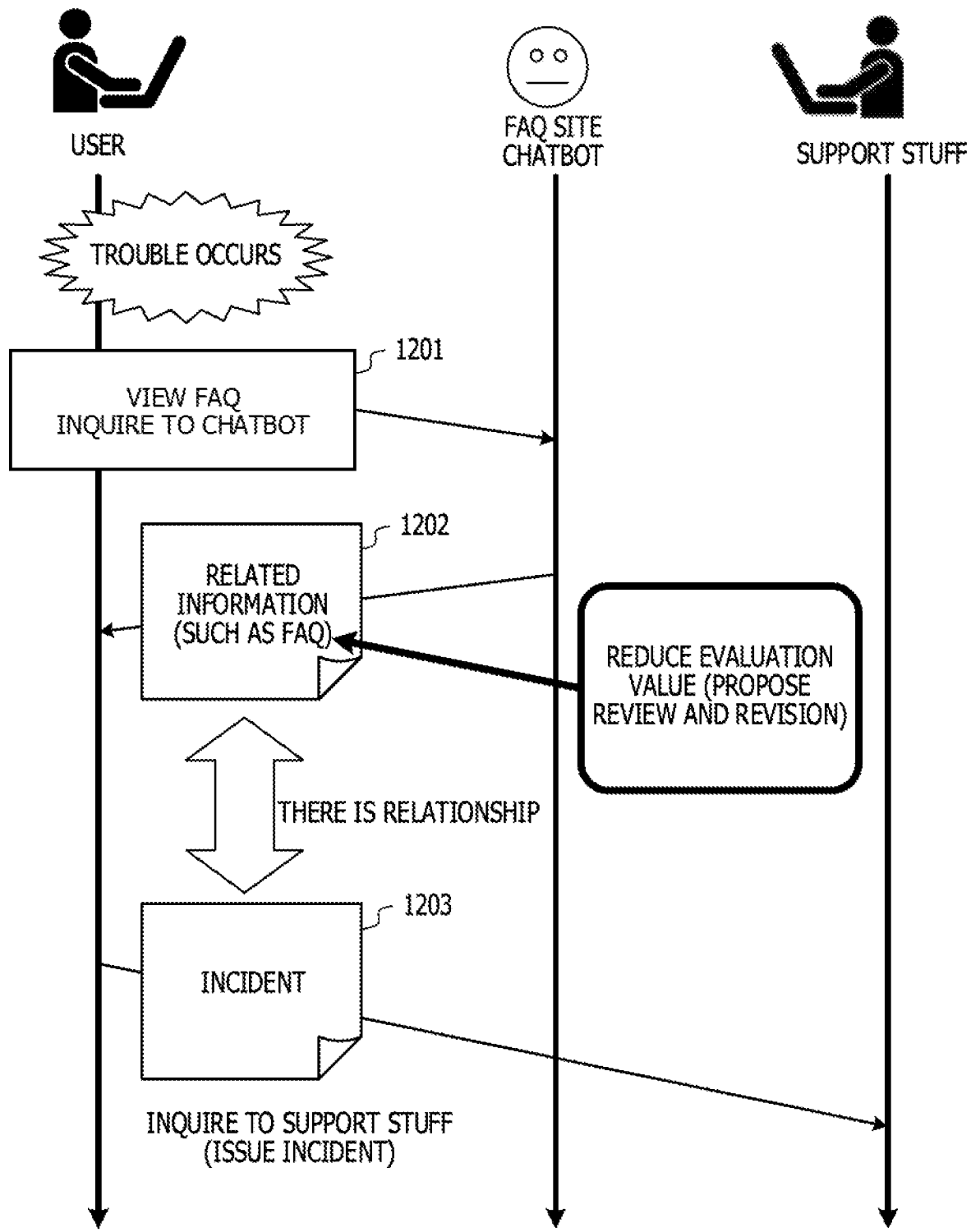
FIG. 12 illustrates a diagram explaining an effect of the incident management system.

FIG. 12 illustrates a diagram explaining an effect of the incident management system S2 described above. For example, FAQs are made available to users for a case where a user has a trouble while the user is using a product or a service. In this case, before making an inquiry to a support staff, the user may view information, such as FAQs, relating to the trouble or use a chatbot function (1201) to attempt to solve the trouble by himself or herself. On the other hand, even after viewing such related information, an inquiry to a support staff may be made (incident issuance). More specifically, for example, there is a case as in FIG. 12 where a user might not solve a trouble even though the user has viewed related information 1202 for solving the trouble and required to make an inquiry to a support staff (incident 1203 in FIG. 12). In this case, there may be a possibility that the effectiveness of the related information 1202 for trouble solving (deterrent of incident issuance) is not sufficient though there is a relationship between the related information 1202 viewed in advance and the incident 1203.

In this case, according to this embodiment, it is controlled such that the evaluation value for the related information 1202 viewed before issuance of the incident 1203 is reduced (to indicate a lower effectiveness). Therefore, the evaluation for related information may be optimized from a viewpoint that providing the related information that may be viewed by a user may suppress issuance of an incident. The thus set evaluation values are usable for revision or review of information on FAQs for better information.

For example, a support staff or an administrator of the incident management system (S, S2) may be notified to review details included in related information having an effectiveness indicated by the evaluation value lower than a predetermined reference. For dealing with an incident, a support staff may also view information relating to the past incidents including related information and those described as FAQs according to this embodiment. In this case, for related information having a lower effectiveness indicated by an evaluation value than a predetermined reference, information indicating the lower effectiveness (or a possibility thereof) may be displayed on an output screen of a terminal apparatus (such as an output screen of the output unit 203) used by a support staff.

Additionally, the chatbot 902 may use an evaluation value as a selection reference for selecting related information to be presented to a user so that, for example, related information having a lower effectiveness indicated by an evaluation value than the predetermined reference is not easily selected (or not selected). In other words, also in a case where the chatbot 902 is used, the execution of feedback to the chatbot 902 by using an evaluation value may suppress presentation of related information that is not effective for trouble solving as an answer to a user.

Figure 13:
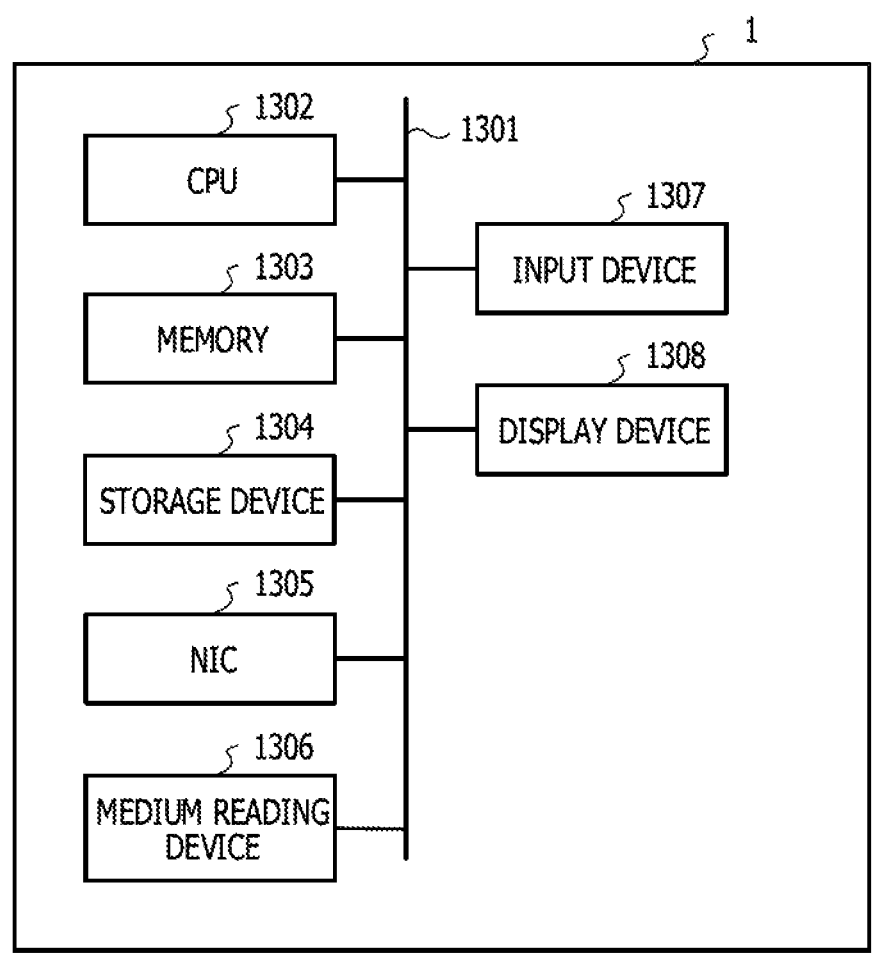
FIG. 13 illustrates an example of a hardware configuration of the server apparatus according to the embodiment.

FIG. 13 is an example of a hardware configuration of the server apparatus 1 according to this embodiment. Though FIG. 13 illustrates an example of a hardware configuration of the server apparatus 1, the same configuration is also applicable in the management terminal apparatus 2 and the user terminal apparatus 3, as described below.

The server apparatus 1 is an information processing apparatus including a central processing unit (CPU) 1302, a memory 1303, a storage device 1304, an NIC 1305, a medium reading device 1306, an input device 1307 and a display device 1308, which are connected to each other via a bus 1301, for example.

The CPU 1302 controls various operations in the server apparatus 1. The memory 1303 and the storage device 1304 store a program that executes processes according to this embodiment and various kinds of data used for the processes. For example, the storage device 1304 is a storage medium such as a hard disk drive (HDD) or a solid state drive (SSD). The storage device 1304 may not be internally included in the server apparatus 1 but may be an external storage device or an online storage accessible by the server apparatus 1.

The CPU 1302 is a processor that may implement functional units included in the processing unit 110 illustrated in FIG. 2 and functions of the above mentioned chatbot by reading out the program stored in the memory 1303 or the storage device 1304 and executing processes and controls. Each of the memory 1303 and the storage device 1304 may function as the storage unit 120 illustrated in FIG. 2, for example. A hardware circuit or processor such as a micro processing unit (MPU) and an application specific integrated circuit (ASIC) may be substituted for the CPU 1302. The CPU 1302 may be a single core processor, a multi core processor or a set of a plurality of processors.

The NIC 1305 is a hardware module to be used for data transmission/reception over a wired or wireless network. The NIC 1305 may function as the communication unit 101 under control of the CPU 1302.

The medium reading device 1306 is a device that reads data from a recording medium. The medium reading device 1306 is, for example, a disk drive that reads data stored in a disk medium such as a CD-ROM or a DVD-ROM, a card slot that reads data stored in a memory card or a connection port for a flash memory. A part or all of data stored in the storage unit 120 may be stored in a recording medium readable by using the medium reading device 1306.

The input device 1307 is a device that receives input and designation by a system administrator or the like. Examples of the input device 1307 include, for example, a keyboard, a mouse, and a touch pad. The display device 1308 displays various kinds of information under control of the CPU 1302. The display device 1308 is, for example, a liquid crystal display, an organic electro luminescence (EL) display, or the like.

Because the management terminal apparatus 2 and the user terminal apparatus 3 according to this embodiment may be a computer having the same hardware configuration as the one illustrated in FIG. 13, any repetitive description will be omitted. The specific hardware modules (models and performances) of the CPU, the memory, the storage device, the NIC, the medium reading device, the input device, and the output device may be different in each apparatuses.

Though the incident management system S (and S2) is an example of a system including one server apparatus 1 and one management terminal apparatus 2 as hardware, the numbers of the apparatuses may not be uniquely limited including the case where the numbers are one for each. For example, the incident management system S (and S2) may be implemented by a single hardware module having the functions of the server apparatus 1 and the management terminal apparatus 2. The number of the user terminal apparatus 3 may not be limited to one.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information management apparatus comprising:
    a memory configured to store frequently asked question (FAQ) view histories, the FAQ view histories including a view history for each of a plurality of frequently asked questions (FAQs), the view history for each of the plurality of FAQs including information relating to inquiry information including an identifier of a user for each of the FAQ view histories and contents of inquiries; and
    a processor coupled to the memory and the processor configured to
        perform extraction of a first FAQ view history of a first user from the FAQ view histories in response to receiving first inquiry information including an identifier of the first user and a content of a first inquiry by determining a match between the identifier of the first user with the identifier of the user of at least one of the FAQ view histories,
        perform a determination of whether the first FAQ view history of the first user includes first information relating to the first inquiry information, the first inquiry information including a plurality of items, the first information including an answer to the FAQ of the first FAQ view history, and the determination being performed based on a ratio of a number of items having same contents between the first inquiry information and the first information to a number of items in the plurality of items, and
        perform modification of a first evaluation value associated with the first information in response to the determination that the first FAQ view history includes the first information.

2. The information management apparatus according to claim 1, wherein the modification includes modifying the first evaluation value associated with the first information to a second evaluation value indicating a lower effectiveness than the first evaluation value.

3. The information management apparatus according to claim 1, wherein the ratio is not less than a threshold value.

4. The information management apparatus according to claim 1, wherein the extraction includes excluding, from the FAQ view histories, one or more FAQ view histories prior to a certain period from the receiving of the first inquiry information.

5. The information management apparatus according to claim 1, wherein the first inquiry information is inquiry information input to a chatbot.

6. The information management apparatus according to claim 5, wherein the first information is information answered to the first user by the chatbot.

7. A computer-implemented information management method comprising:
    extracting a first view history of a first user from frequently asked question (FAQ) view histories, the FAQ view histories including a view history for each of a plurality of frequently asked questions (FAQs), the view history for each of the plurality of FAQs including information relating to inquiry information including an identifier of a user for each of the FAQ view histories and contents of inquiries in response to receiving first inquiry information including an identifier of the first user and a content of a first inquiry by determining a match between the identifier of the first user with the identifier of the user of at least one of the FAQ view histories;
    determining whether the first FAQ view history of the first user includes first information relating to the first inquiry information, the first inquiry information including a plurality of items, the first information including an answer to the FAQ of the first FAQ view history, and the determining being based on a ratio of a number of items having same contents between the first inquiry information and the first information to a number of items in the plurality of items; and
    modifying a first evaluation value associated with the first information in response to the determining that the first FAQ view history includes the first information.

8. The information management method according to claim 7, wherein the modifying includes modifying the first evaluation value associated with the first information to a second evaluation value indicating a lower effectiveness than the first evaluation value.

9. The information management method according to claim 7, wherein the ratio is not less than a threshold value.

10. The information management method according to claim 7, wherein the extracting includes excluding, from the FAQ view histories, one or more FAQ view histories prior to a certain period from the receiving of the first inquiry information.

11. The information management method according to claim 7, wherein the first inquiry information is inquiry information input to a chatbot.

12. The information management method according to claim 11, wherein the first information is information answered to the first user by the chatbot.

13. A non-transitory computer-readable instructions executable by one or more computers, the instructions comprising:
   one or more instructions for extracting a first view history of a first user from frequently asked question (FAQ) view histories, the FAQ view histories including a view history for each of a plurality of frequently asked questions (FAQs), the view history for each of the plurality of FAQs including information relating to inquiry information including an identifier of a user for each of the FAQ view histories and contents of inquiries in response to receiving first inquiry information including an identifier of the first user and a content of a first inquiry by determining a match between the identifier of the first user with the identifier of the user of at least one of the FAQ view histories;
   one or more instructions for determining whether the first FAQ view history of the first user includes first information relating to the first inquiry information, the first inquiry information including a plurality of items, the first information including an answer to the FAQ of the first FAQ view history, and the determining being based on a ratio of a number of items having same contents between the first inquiry information and the first information to a number of items in the plurality of items; and
   one or more instructions for modifying a first evaluation value associated with the first information in response to the determining that the first FAQ view history includes the first information.

* * * * *